US012542833B2

(12) United States Patent
Brown

(10) Patent No.: US 12,542,833 B2
(45) Date of Patent: Feb. 3, 2026

(54) METHODS, SYSTEMS, AND DEVICES FOR AN EVALUATION PLATFORM

(71) Applicant: GTN Human Services, LLC, Oklahoma City, OK (US)

(72) Inventor: Justin Brown, Nichols Hills, OK (US)

(73) Assignee: GTN Human Services, LLC, Oklahoma City, OK (US)

( * ) Notice: Subject to any disclaimer, the term of this patent is extended or adjusted under 35 U.S.C. 154(b) by 112 days.

(21) Appl. No.: 18/666,424

(22) Filed: May 16, 2024

(65) Prior Publication Data

US 2024/0422237 A1 Dec. 19, 2024

Related U.S. Application Data

(60) Provisional application No. 63/467,812, filed on May 19, 2023.

(51) Int. Cl.
*H04L 67/50* (2022.01)
*G06N 20/00* (2019.01)
*G06Q 50/10* (2012.01)
*H04L 67/306* (2022.01)

(52) U.S. Cl.
CPC .......... *H04L 67/535* (2022.05); *G06N 20/00* (2019.01); *G06Q 50/10* (2013.01); *H04L 67/306* (2013.01)

(58) Field of Classification Search
CPC ..... H04L 67/535; H04L 67/306; G16H 50/20; G16H 20/00
See application file for complete search history.

(56) References Cited

U.S. PATENT DOCUMENTS

| | | | |
|---|---|---|---|
| 11,582,240 B1* | 2/2023 | Bhatt | G06F 21/6245 |
| 2010/0138370 A1* | 6/2010 | Wu | H04H 60/33 |
| | | | 707/769 |
| 2017/0323081 A1 | 11/2017 | Govro et al. | |
| 2018/0129971 A1* | 5/2018 | Vlassis | G06N 20/00 |
| 2018/0189378 A1* | 7/2018 | Barnea | G06F 16/287 |

(Continued)

OTHER PUBLICATIONS

International Search Report and Written Opinion issued in International Application No. PCT/US24/29721, mailed Aug. 8, 2024.

*Primary Examiner* — David R Lazaro
(74) *Attorney, Agent, or Firm* — McDonnell Boehnen Hulbert & Berghoff LLP

(57) ABSTRACT

In one aspect, an example computer-implemented method includes (a) receiving user activity data, (b) receiving user agency data, (c) generating a user profile, wherein the user profile is based on the received user activity data and user agency data, and wherein the user profile contains personal information associated with the user, (d) issuing a digital representation, wherein the digital representation does not contain the personal information associated with the user, (e) receiving a plurality of predetermined persona profiles, (f) identifying a persona match using one or more machine learning models, (g) based on the identified persona match, identifying a suggested action for the user of the client computing device, and (g) transmitting instructions that cause the client computing device to display, via the user interface of the client computing device, a graphical indication of the suggested action to the user of the client computing device.

19 Claims, 16 Drawing Sheets

(56) References Cited

U.S. PATENT DOCUMENTS

| | | | |
|---|---|---|---|
| 2021/0319887 A1* | 10/2021 | Derrick, Jr. | A61B 5/7275 |
| 2021/0406933 A1* | 12/2021 | Carmody | G06N 5/04 |
| 2022/0100809 A1* | 3/2022 | Lee | G06F 16/9538 |
| 2022/0237548 A1* | 7/2022 | Gilani | G06N 3/08 |
| 2022/0284340 A1* | 9/2022 | Choudhary | G06N 20/10 |
| 2023/0110674 A1 | 4/2023 | Wilson et al. | |
| 2023/0215533 A1* | 7/2023 | Ohayon | G16H 10/20 |
| | | | 705/2 |
| 2024/0135279 A1* | 4/2024 | Gong | G06Q 10/063118 |
| 2024/0144150 A1* | 5/2024 | Johnston | G06F 16/285 |
| 2024/0330765 A1* | 10/2024 | Oliveira | G06N 20/00 |
| 2024/0422237 A1* | 12/2024 | Brown | H04L 67/535 |

\* cited by examiner

Fig. 5A

Persona Background & Current Lifestyle

*Financial Situation:*

Living at or below the poverty level, Mariana struggles to pay her bills and provide for her children. She lives in a small, modest apartment and relies on public transportation. She takes advantage of government assistance programs such as SNAP (Supplemental Nutrition Assistance Program) and Medicaid to help cover the cost of food and healthcare for her family. Despite her efforts, she often faces financial difficulties and is unable to save money for emergencies or her children's future.

*Hobbies and Interests:*

Although Mariana has little free time due to her work schedule, she enjoys spending her weekends with her children. They often visit local parks, where Sofia and Diego can play while Mariana relaxes and unwinds from her long work week. She also loves to cook traditional Mexican meals for her family, as it reminds her of her heritage and the love she has for her culture.

*Personality:*

Mariana is a strong and resilient woman. She is fiercely protective of her children and would do anything to ensure their safety and happiness. Her determination and work ethic are evident in her commitment to working two jobs and providing for her family. Despite the challenges she faces, Mariana remains optimistic and hopeful for a better future.

Fig. 5B

Persona Goals

Mariana's primary goals in life revolve around improving the quality of life for herself and her children

- *Education:* Mariana dreams of going back to school to earn a degree or learn a trade that would enable her to secure a better-paying job and provide a more stable financial future for her family.

- *Financial Stability:* One of Mariana's goals is to achieve financial stability and independence, allowing her to break the cycle of poverty and provide a more comfortable life for her children.

- *Better Living Environment:* Mariana hopes to move her family to a safer, more supportive neighborhood with better schools and resources, which would offer her children more opportunities for growth and development.

- *Work-Life Balance:* She aims to find a job that allows her to maintain a healthy work-life balance, giving her more time to spend with her children and engage in activities that nurture their physical, emotional, and intellectual well-being.

- *Personal Growth:* Mariana is also focused on her own personal growth and self-improvement, aiming to develop her skills, learn new hobbies, and nurture her mental and emotional well-being.

- *Cultural Connection:* As a proud Hispanic woman, Mariana wants to maintain a strong connection to her cultural roots and pass down her heritage to her children by teaching them about their traditions and the Spanish language.

Fig. 5C

Available Resources in San Antonio, TX

Mariana can reach out to several local organizations in San Antonio, Texas, that can provide her with resources, support, and assistance to help her achieve her goals. Some of these organizations include:

- *Alamo Colleges District* (alamo.edu): Mariana can explore affordable educational opportunities, including degree programs, certifications, and workforce training, at one of the Alamo Colleges, such as San Antonio College, St. Philip's College, or Palo Alto College.

- *Goodwill San Antonio* (goodwillsa.org): This organization provides job training, employment services, and job placement assistance to help individuals improve their employability and find stable employment.

- *Family Service Association* (family-service.org): This organization offers various programs to support low-income families, including financial education and coaching, workforce development, and childcare services.

- *Project QUEST* (questsa.org): Project QUEST offers workforce training and support to help individuals secure well-paying jobs in high-demand industries.

- *San Antonio Department of Human Services* (sanantonio.gov/humanservices): Mariana can contact the Department of Human Services to learn about and apply for government assistance programs, such as SNAP, Medicaid, and childcare assistance.

- *San Antonio Food Bank* (safoodbank.org): The food bank provides food assistance to those in need, helping Mariana stretch her budget and ensure her family has nutritious meals.

- *Catholic Charities, Archdiocese of San Antonio* (ccaosa.org): This organization offers various support services, including financial assistance, family and children's services, and immigration and refugee services.

- *AVANCE San Antonio* (avance-sa.org): AVANCE offers early childhood education and parenting programs, helping Mariana support her children's development and well-being.

- *YWCA San Antonio* (ywcasa.org): The YWCA offers programs and resources to empower women, including career and financial services, childcare assistance, and health and wellness initiatives.

These organizations can provide Mariana with the resources, guidance, and support she needs to work toward her goals and improve her family's situation.

Fig. 5E

Employment and Career Pathway

Based on Mariana's background, interests, and goals, three likely career pathways for her could be:

- *Medical Assistant:* Mariana could pursue a career as a medical assistant, which typically involves working in healthcare facilities such as clinics, hospitals, or private practices. Medical assistants perform administrative tasks and support medical professionals with patient care. This career typically requires completing a certificate or diploma program, which can be done at a local community college or trade school. Medical assistants are in high demand and generally receive better pay and benefits than many retail or service positions.

- *Office Administrator or Receptionist:* Building on her experience as an office cleaner, Mariana could transition to a more stable, better-paying job as an office administrator or receptionist. This would require developing her computer, communication, and organizational skills. She could take courses at a community college or pursue online learning opportunities to develop the necessary skills. This role offers more stable working hours and the opportunity to work in various industries.

- *Early Childhood Educator or Childcare Worker:* Given her love for her children and interest in their well-being, Mariana might find a career in early childhood education or childcare rewarding. She could work in a preschool, daycare center, or as a private childcare provider. This career path typically requires obtaining a Child Development Associate (CDA) credential, an associate degree, or a bachelor's degree in early childhood education, depending on the specific role and employer requirements.

Each of these career pathways offers opportunities for growth and development, as well as increased financial stability for Mariana and her family. By pursuing additional education and training, Mariana can increase her earning potential and work toward achieving her goals.

Fig. 5F

Additional Information

Personal Information:
- Full name: Mariana Fernandez
- Date of birth: June 15, 1994
- Citizenship or immigration status: U.S. citizen

Household Composition:
- Number of people living in the household: 3 (Mariana and her two children)
- Names, dates of birth, and Social Security numbers of all household members: Mariana Fernandez, Sofia Fernandez (DOB: March 10, 2017), and Diego Fernandez (DOB: July 5, 2020)
- Relationship between household members: Mariana is the mother of Sofia and Diego
- Whether any household members are elderly, disabled, or pregnant: None

Income:
- Total monthly income for all household members before taxes: $2,000 (estimated)
- Sources of income: Employment at a grocery store and office cleaning job
- Frequency of income received: Bi-weekly

Resources and Assets:
- Checking and savings account balances: $500 in checking, $100 in savings (estimated)
- Ownership of property, vehicles, or other assets: No property ownership; uses public transportation
- Retirement accounts, stocks, or bonds: None

Deductible Expenses:
- Monthly housing costs, including rent or mortgage payments and property taxes: $900 rent (estimated)
- Utilities, such as water, electricity, heating, and telephone: $200 (estimated)
- Childcare expenses, if applicable: N/A (Mariana manages childcare within her family and friends network)
- Child support payments made to non-household members: None
- Medical expenses for elderly or disabled household members: None

Employment Information:
- Current employment status and job details for all household members: Mariana is employed at a grocery store and works as an office cleaner; her children are not employed
- Reason for unemployment, if applicable: N/A

Fig. 5G

METHODS, SYSTEMS, AND DEVICES FOR AN EVALUATION PLATFORM

RELATED APPLICATION

This application claims priority to U.S. Provisional Application No. 63/467,812 filed May 19, 2023, which is incorporated herein by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In another aspect, an example computer-implemented method is disclosed. The method includes: (a) receiving, by an evaluation platform and from a client computing device, user activity data, wherein the user activity data is indicative of one or more activities associated with a user of the client computing device; (b) receiving, by the evaluation platform and from an agency computing device, user agency data, wherein the user agency data is indicative of one or more agency records associated with the user of the client computing device; (c) generating, by the evaluation platform, a user profile, wherein the user profile is based on the received user activity data and user agency data, and wherein the user profile contains personal information associated with the user; (d) issuing, by the evaluation platform, a digital representation, wherein the digital representation indicates at least one of: (i) the one or more activities associated with a user of the client computing device; and (ii) the one or more agency records associated with the user of the client computing device, and wherein the digital representation does not contain the personal information associated with the user; (e) receiving, by the evaluation platform and from a persona profile computing device, a plurality of predetermined persona profiles, wherein each of the predetermined persona profiles comprises a unique set of personality attributes; (f) identifying, by the evaluation platform, a persona match using one or more machine learning models, wherein the one or more machine learning models are configured to generate the persona match using the digital representation and the plurality of predetermined persona profiles, and wherein the one or more machine learning models indicate, for each of the predetermined persona profiles, a respective extent of correlation to the digital representation; (g) based on the identified persona match, identifying, by the evaluation platform, a suggested action for the user of the client computing device; and (g) transmitting, by the evaluation platform and to the client computing device, instructions that cause the client computing device to display, via the user interface of the client computing device, a graphical indication of the suggested action to the user of the client computing device.

In another aspect, one or more non-transitory computer-readable media storing software comprising instructions executable by one or more processors that, upon such execution, cause the one or more processors to perform operations comprising the methods described herein is disclosed.

In another aspect, an electronic system is disclosed. In examples, the electronic system comprises one or more processing devices and one or more machine-readable storage devices for storing instructions that are executable by the one or more processing devices to perform operations comprising the methods described herein.

BRIEF DESCRIPTION OF THE DRAWINGS

Figure 5A:
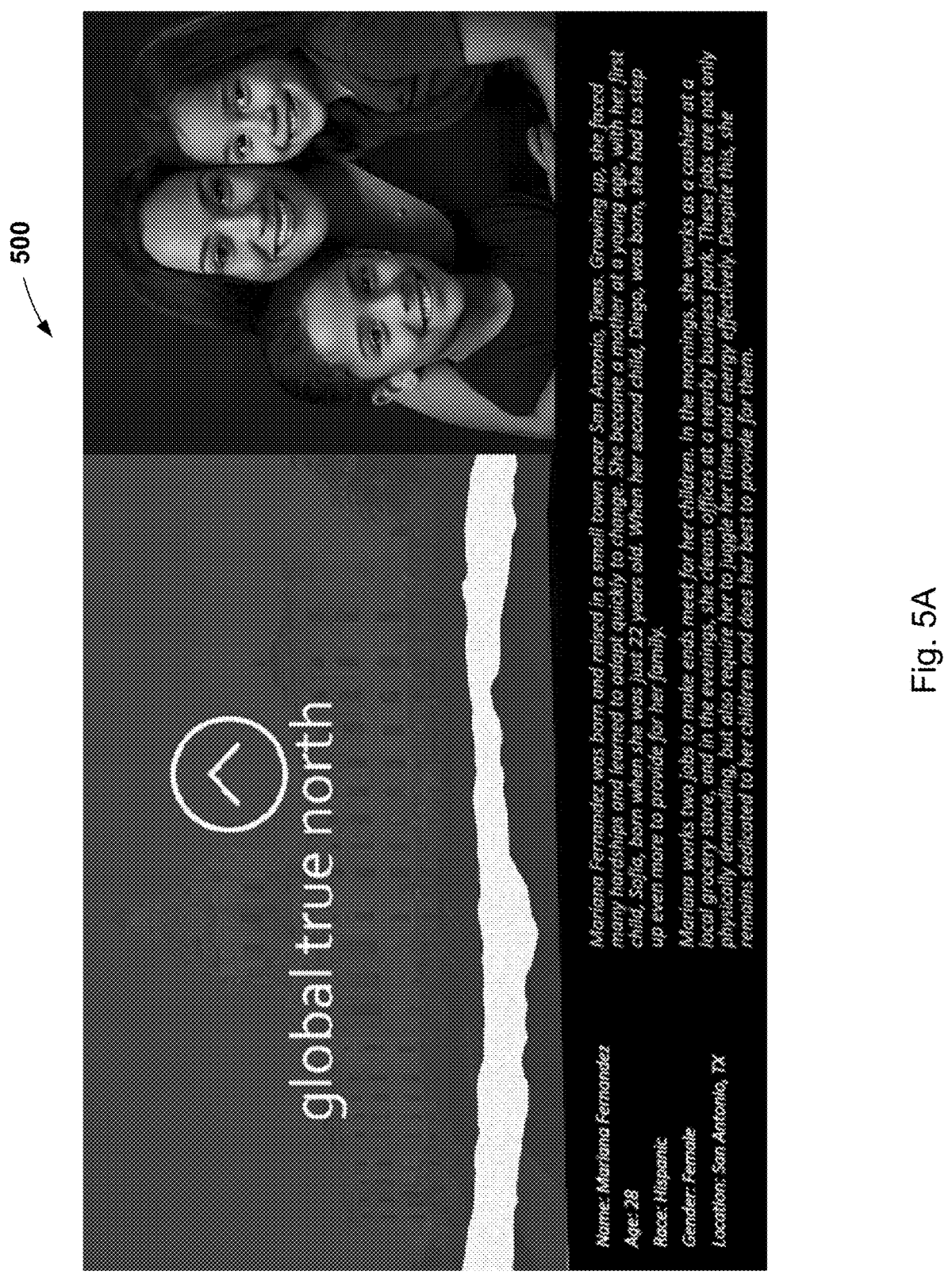

FIG. 5A is an example predetermined persona profile, according to an example embodiment.

FIG. 5B is the example predetermined persona profile of FIG. 5A, but at a second portion.

FIG. 5C is the example predetermined persona profile of FIGS. 5A-B, but at a third portion.

FIG. 5E is the example predetermined persona profile of FIGS. 5A-5D, but at a fifth portion.

FIG. 5F is the example predetermined persona profile of FIGS. 5A-5E, but at a sixth portion.

FIG. 5G is the example predetermined persona profile of FIGS. 5A-5F, but at a seventh portion.

DETAILED DESCRIPTION

I. Overview

Figure 1:
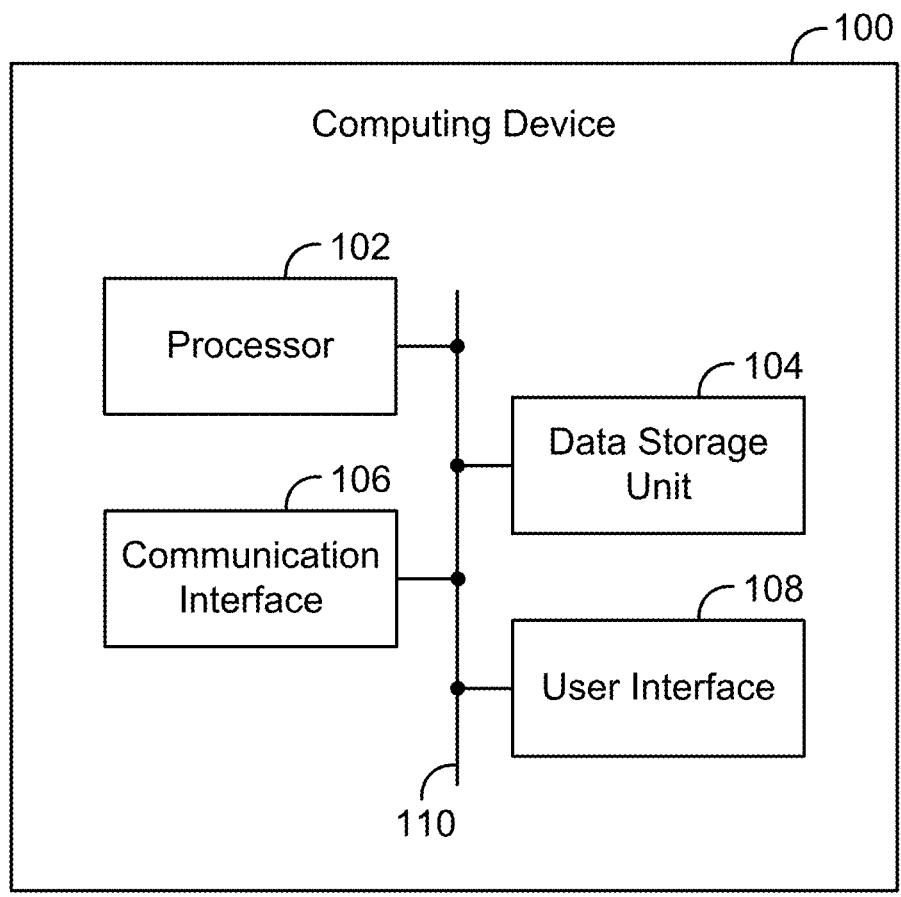
FIG. 1 is a simplified block diagram of an example computing device.

Existing systems for evaluating individuals and providing career, health, and other lifestyle goals typically rely on human intervention, planning, and advice. This human involvement can be helpful for personalizing feedback, but is often tainted by bias, misinformation, and other unhelpful conditions for the recipient of such career, health, and other lifestyle advice, much of which may go undetected or addressed.

For example, for current and potential recipients of governmental benefits (e.g., Supplemental Nutrition Assistance Program (SNAP), short- and long-term disability assistance, unemployment assistance, Medicare, Medicaid, etc.), there may be misinformation that causes existing governmental employees or agencies to erroneously approve or deny governmental benefits for one or more individuals. For example, there may one or more errors on for a record associated with a benefit recipient that result in the recipient being denied one or more benefits to which he/she would otherwise be entitled, and so forth.

Furthermore, even in situations where such errors may be detected and/or the individual receives the benefits, there is often no further advice, input, or planning provided to the individual to encourage personal or professional growth, which may lead to a lifetime of receiving the benefits, with assistance or indication on how to help address the route of any potential underlying issues, which may, in turn, reduce the ability of the individual to return to circumstances wherein he/she does not require the assistance and/or reduce the ability other individuals to receive such benefits. Ultimately, this result negatively impacts the individual receiving the benefits, as well as others that may be unable to receive such benefits.

If, however, a computing system could provide a secure and novel solution for increasing error detection and promote beneficial planning for individual users to improve his/her quality of life, then the efficiency of supplying governmental benefits (e.g., Supplemental Nutrition Assistance Program (SNAP), short- and long-term disability assistance, unemployment assistance, Medicare, Medicaid, etc.) could be increased and the effect that these benefits have on the recipients would be also be improved, all of which could result in a significant improvement of resources.

Accordingly, features of the present disclosure can help to address these and other issues to provide an improvement to select technical fields.

More specifically, features of the present disclosure relates to methods and systems of indexing and analyzing user information from a variety sources to create a combined user profile that provides a holistic life view of an individual user, and then undertaking a securitization protocol to create a digital representation of that user's combined profile, except without any personal identifying information—thereby ensuring that the user's privacy is upheld and his/her information is completely securitized prior to further analysis. Once the user's digital representation is issued, then a multilayer machine learning mode (e.g., trained with a host of persona profile data and predictive pathway data) utilizes the information in the token to provide one or more suggested actions for the user to improve his/her quality of life, as well as one or more specific instructions on how to do so (e.g., using an artificial intelligence and/or machine learning model to guide the user through completing the suggested actions). Then, based on receiving one or more indications of how successful the suggested actions and/or instructions were in improving the user's quality of life (e.g., the user no longer requires the benefits of a SNAP program), the machine learning model may continue to refine its interpretation and/or matching of the persona profiles and/or the predictive pathway models, among other possibilities. These features will now be described.

Embodiments of the present invention provide methods, systems, and devices that allow a computing system to effectively analyze user activity data, as well as data associated with the user (e.g., agency record data and/or commercially-available data associated with the user) and streamline the identification of one or more suggested pathways to improve the user's life and associated government benefits, thereby resulting in a significant improvement over existing systems and solutions.

For example, the disclosed embodiments disclose, among other features, an improved platform that leverages the security, transparency, speed, and privacy of one or more digital technologies, including block-chain and token technologies, artificial intelligence, and machine learning models, to enhance user experience in engaging with the private sector, including employers and service providers (e.g., healthcare facilities), as well as governmental agencies and the products and services they receive from the user as well as the benefits received by the user based on the same. The techniques described are not limited to any particular industry, and are applicable to all platform types.

A computer-implemented method may include a computing system (e.g., a cloud-based computing system). This computing system can be used to perform various operational functions to analyze data and actives associated with a user and take one or more responsive actions based on the data.

For example, a user may exhibit actions and/or trends by one or more actions relating to his/her life, one or more of which may be associated with different aspects in his/or everyday life. For example, a user may input data into a mobile computing device (e.g., a user of a smartphone) that indicates his/her: (i) name; (ii) birthdate; (iii) demographic information; (iv) household information; (v) health information; (vi) mental health information; (vii) substance abuse information; (viii) financial information; (ix) educational information; (x) employment information; and (xi) government benefit information. In a further aspect, an evaluation platform may receive this user activity data, among other data, and take one or more responsive actions.

For example, in example embodiments, the evaluation platform may receive data indicative of one or more agency records associated with the user. This user agency data may include one or more of the following: (i) one or more names associated with the user; (ii) a birthdate associated with the user; (iii) demographic information associated with the user; (iv) household information associated with the user (e.g., children, spouses, others living together); (v) health information associated with the user; (vi) mental health information associated with the user; (vii) substance abuse information associated with the user; (viii) financial information associated with the user; (ix) educational information associated with the user; (x) employment information associated with the user; and (xi) government benefit information associated with the user.

In some examples, the evaluation platform may also receive data that is indicative of one or more commercial characteristics associated with a user. In some examples, the commercial user data may include one or more of the following types of data associated with the user of the client computing device: (i) name; (ii) contact information; (iii) demographic information; (iv) household information; (v) health information; (vi) mental health information; (vii) substance abuse information; (viii) financial information; (ix) educational information; (x) employment information; and (xi) credit score information.

In example embodiments, the evaluation platform may generate a user profile associated with the user, which may be based on a number of sources of data, including any received user activity data, user agency data, and/or commercial user data, among others. It is also possible, if not likely, that this data may include personal information associated with the user (personal identifiable information ("PII")), which the user would not want distributed outside of any authorized party or transaction. Thus, there is direct need to treat the compiled user data under one or more security protocols.

In some embodiments, generating, by the evaluation platform, the user profile, further comprises comparing the received user activity data and the received user agency data to determine any anomalies between the received user activity data and the received user agency data. To do so, in examples, the evaluation platform may include a computing node disposed within a distributed computing network that includes a plurality of computing nodes and/or a distributed ledger maintained on the plurality of computing nodes, some or all of which may perform a number of functions. For example, the evaluation platform may store one or more portions of the user data as one or more ledger entries, which may be anonymized to remove any concern with PII (e.g., via a hashing function) and issue one or more representations of this anonymized and PII-scrubbed ledger entry. In example, to do so, the evaluation system may issue a digital representation (e.g., a token, one or more entries on a block-chain ledger, etc.) that indicates at least one of: (i) one or more activities associated with a user of the client computing device (i.e., the user activity data), (ii) one or more agency records associated with the user of the client computing device (i.e., the user agency data), and/or (iii) one or more commercial characteristics associated with a user of the client computing device (i.e., the commercial user data), but does not contain any personal information (e.g., PII) associated with the user. In a further aspect, the evaluation platform may use this digital representation in a number of ways.

For example, the evaluation platform may receive a plurality of predetermined persona profiles, each of which may contain a unique set of personality attributes (e.g., financial situation, hobbies and interests, personality), and utilize the digital representation and the plurality of predetermined persona profiles to identify a persona match for the user. To do so, in examples, the evaluation platform may use one or more machine learning models to generate the persona match using the digital representation and the plurality of predetermined persona profiles by evaluating, for each of the predetermined persona profiles, a respective extent of correlation to the digital representation. In some example embodiments, this evaluation may be based on an indication from the one or more machine learning models that a particular predetermined persona profile contains the highest extent of correlation to the individual user's digital representation. Further, in some example embodiments, prior to the evaluation platform identifying the persona match, the one or more machine learning models may have been trained to perform, for each of the predetermined persona profiles, identification of a respective extent of correlation to the digital representation and/or a digital representation with similar attributes. Once one or more persona matches are identified, the evaluation system can use these matches in one or more ways.

For example, based on any identified persona match, the evaluation platform may identify a suggested action for the user associated with the digital representation (e.g., the user of the client computing device). To do so, in examples, the evaluation platform may use one or more machine learning models to match and/or predict a suggested action item that will improve the user's life experience (e.g., based on one or more attributes of the user and/or a persona profile that matched with the user). In example embodiments, these suggested actions may include one or more of the following suggested actions for the user: (i) secure one or more vital documents associated with the user; (ii) secure basic needs associated with the user; (iii) improve one or more health statuses associated with the user; (iv) improve one or more mental health statuses associated with the user; (v) improve one or more family preservation statuses associated with the user (e.g., parenting classes and fatherhood programs, as well as domestic violence interventions; (vi) improve one or more household statuses associated with the user; (vii) improve one or more substance abuse statuses associated with the user; (viii) improve one or more financial statuses associated with the user; (ix) improve one or more educational statuses associated with the user; (x) improve one or more employment statuses associated with the user; and (xi) improve one or more government benefit statuses associated with the user, among other pathway possibilities.

For example, based on the identified suggested action, the evaluation platform may identify one or more pathways to accomplishing the suggested actions for the user, as well as instructions on how to proceed on the identified one or more pathways and/or accomplish the suggested actions. To do so, in examples, the evaluation platform may use one or more machine learning models to match and/or predict a pathway and/or a set of instructions to accomplish the one or more suggested action item (e.g., based on one or more attributes of the user, the persona profile that matched with the user, and/or one or more pathways associated with the same). In example embodiments, these pathways may include one or more of the following: (i) vital documents pathway, (ii) basic needs pathway; (iii) health pathway, (iv) mental health pathway; (v) substance abuse pathway; (vi) financial independence pathway; (vii) family building and preservation pathway; (viii) adult education pathway; (ix) career selection pathway; (x) community volunteering pathway; and/or (xi) career pathway, among other possibilities. For example, in examples, the evaluation platform may use one or more machine learning models to match and/or predict a set of instructions to accomplish the one or more suggested action item, including one or more instructions for one or more of the following: (i) securing one or more vital documents associated with the user; (ii) securing basic needs associated with the user; (iii) improving one or more health statuses associated with the user; (iv) improving one or more mental health statuses associated with the user; (v) improving one or more family preservation statuses associated with the user; (vi) improving one or more household statuses associated with the user; (vii) improving one or more substance abuse statuses associated with the user; (viii) improving one or more financial statuses associated with the user; (ix) improving one or more educational statuses associated with the user; (x) improving one or more employment statuses associated with the user; and (xi) improving one or more government benefit statuses associated with the user, among other possibilities.

For example, the evaluation platform may generate and transmit one or more data packets that cause a computing device (e.g., the user's computing device, an agency computing device associated with the user, etc.) to display a graphical indication of one or more types of information described above, including, but not limited to the suggested actions, the pathways, and/or the instructions on how to accomplish the suggested actions and/or proceed on the pathways. To do so, the evaluation platform may utilize one or more specific protocols for providing graphical representations on any one of one or more different types of computing devices (e.g., a smartphone vs. a desktop computing device) and/or operating systems (e.g., Apple® vs. Android®), among other possibilities.

Furthermore, various types of data exchange may be available with regards to a device used by the user, a type of browser, a type of secure algorithm, a virtual private network (VPN), network bandwidth, a preferred language, a preferred input mode (e.g., speech, text, etc.), among other possibilities. Additionally or alternatively, this data may be gathered and analyzed on a more collective level of multiple users (e.g., based on collecting and analyzing data from a host of consumers), multiple client platforms, and so forth.

It should be readily understood that the computing system may receive data associated with a user and/or client platform and may do so from a number of sources. For example, the computing system may receive user input indicating interest in improving a particular portion of his/her life (e.g., going back to school to become a school teacher) at the client platform. Other examples are possible.

Once the data is received, however, the computing system may generate a representation of this data. For example, the computing system may generate one or more entries based on the data. In some embodiments, the computing system may store these one or more entries in a persistently-stored structure (e.g., a distributed network). In some examples, the computing system may generate a time series based on this data. Other examples are possible.

The computing system may also receive and analyze the data. For example, the computer system may compare data related to a performance at the client platform with data related to user activity at the client platform, which can provide significant insights into aspects that impact user experience for a user, while also informing and impacting analysis at the evaluation platform.

Other example embodiments are also possible, many of which are discussed in further detail below.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, and/or a mobile computing device.

B. Example Computing System

Figure 2:
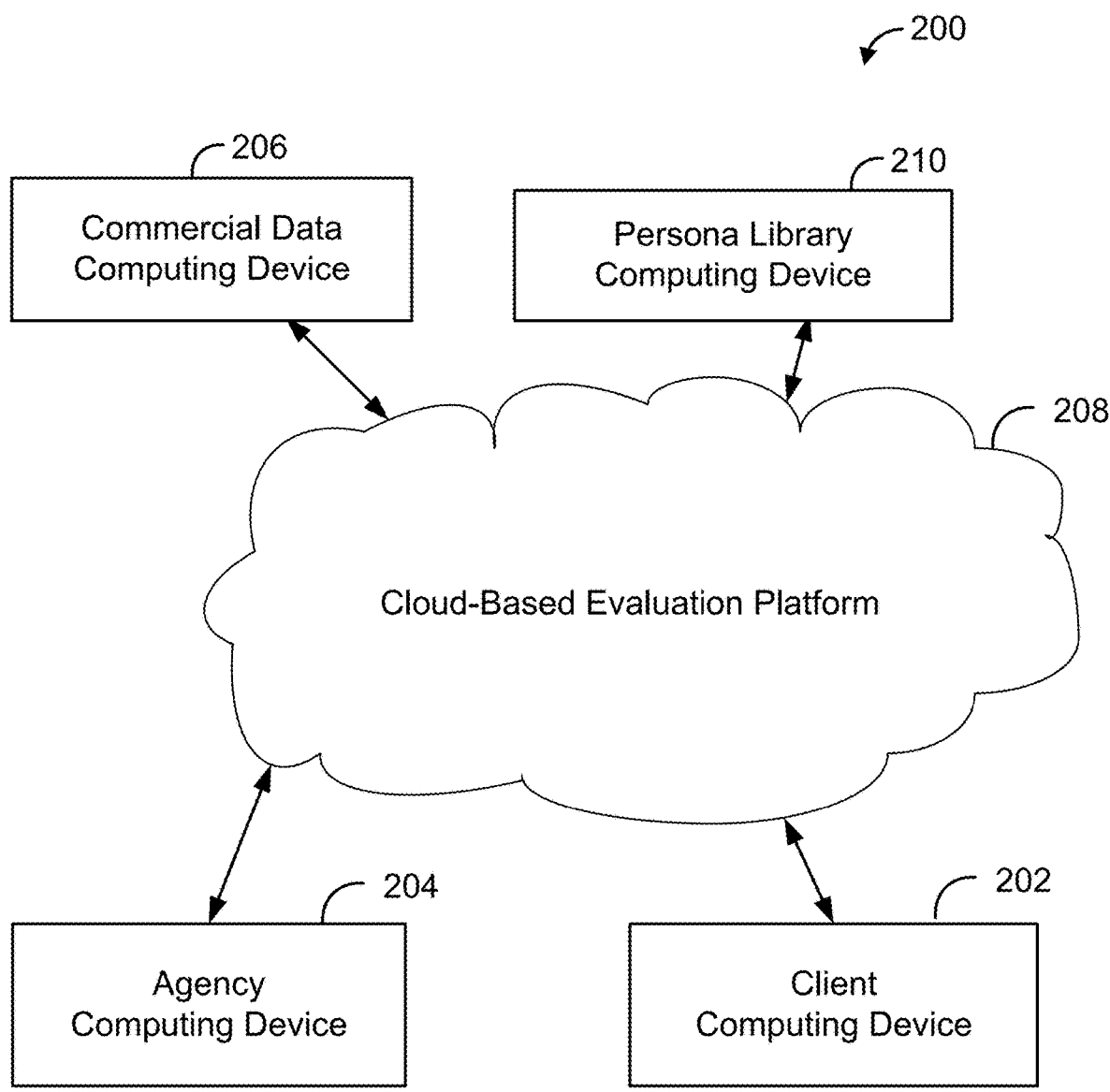
FIG. 2 is a simplified block diagram of an example computing system.

FIG. 2 is a simplified block diagram of an example computing system 200. The computing system 200 can perform various acts and/or functions related to the concepts detailed herein. In this disclosure, the term "computing system" means a system that includes at least one computing device. In some instances, a computing system can include one or more other computing systems, including one or more computing systems controlled by the service provider, a user, a client, different independent entities, and/or some combination thereof.

It should also be readily understood that computing device 100, computing system 200, and all of the components thereof, can be physical systems made up of physical devices, cloud-based systems made up of cloud-based devices that store program logic and/or data of cloud-based applications and/or services (e.g., perform at least one function of a software application or an application platform for computing systems and devices detailed herein), or some combination of the two.

In any event, the computing system 200 can include various components, such as client computing device 202, agency computing device 204, commercial data computing device 206, cloud-based evaluation platform 208, and persona library computing device 210, each of which can be implemented as a computing system.

The computing system 200 can also include connection mechanisms (shown here as lines with arrows at each end (i.e., "double arrows"), which connect client computing device 202, agency computing device 204, commercial data computing device 206, cloud-based evaluation platform 208, and persona library computing device 210 and may do so in a number of ways (e.g., a wired mechanism, wireless mechanisms and communication protocols, etc.).

In practice, the computing system 200 is likely to include many of some or all of the example components described above, such as client computing device 202, agency computing device 204, commercial data computing device 206, cloud-based evaluation platform 208, and persona library computing device 210, which can allow many users to communicate and/or interact with one or more government agencies and/or other parties, many government agencies and/or other parties to communicate and/or interact with the one or more users, and so on.

The computing system 200 and/or components thereof can perform various acts and/or functions (many of which are described above). Examples of these and related features will now be described in further detail.

Within computing system 200, a user associated with a client computing device 202 may interact with client computing device 202 and may do so in number of ways. For example, the client computing device 202 may receive input from a user indicating interest in receiving career, health, family and/or other types of life coaching, as well as personal data about the user (e.g., name, date of birth, current employment status, etc.), and/or other types of data associated with a user, including GPS data associated with a geolocation of the client computing device 202 (and thereby the user). In a further aspect, client computing device 202 may provide time-indexed information from the user to the cloud-based evaluation platform 208 to indicate a user's activities associated with the user (e.g. time-indexed data packets indicative of user activity)—including web- and/or application-based navigation activity, viewing activity, selection or deselection of services offered by the cloud-based evaluation platform 208 to the user, and so). In some examples, this data associated with a user may be inputted into a mobile application associated with cloud-based evaluation platform 208 and executing on client computing device 202.

Cloud-based evaluation platform 208 may take one or more forms and/or include one or more components configured in a variety of ways. For example, cloud-based evaluation platform 208 may include a computing node disposed within a distributed computing network. In a further aspect, this distributed computing network may include a plurality of computing nodes, which may perform a number of functions. For example, this plurality of nodes may maintain a distributed ledger (e.g., a distributed blockchain ledger), a token issuing/exchange protocol, and/or other digital securitization mechanisms, among other possibilities.

In a further aspect, cloud-based evaluation platform 208 may communicate with one or more other computing systems and/or computing devices (including client computing device 202, agency computing device 204, commercial data computing device 206, and/or persona library computing device 210) and may any number of actions based on these communications.

For example, cloud-based evaluation platform 208 may receive data associated with a user via client computing device 202 and take one or more actions based thereon. For example, as a user inputs user information and/or data using client computing device 202, cloud-based evaluation platform 208 may receive and/or retrieve, additional information associated with the user from one or more additional computing devices.

For example, cloud-based evaluation platform 208 may receive data associated with a user from agency computing device 204, including information associated with the user that indicates the user is a past or current recipient of governmental benefits (e.g., Supplemental Nutrition Assistance Program (SNAP), short- and long-term disability assistance, unemployment assistance, Medicare, Medicaid, etc.) and/or information indicating the user's health, household, employment, financial, substance abuse, civil, and/or criminal history, among other types of information. Before doing so, cloud-based evaluation platform 208 may prompt the user (e.g., via client computing device 202) for authorization to access the agency records via agency computing device 204, and, if granted, may also provide proof of the authorization along with the request for the information to the agency computing device 204. In a further aspect, the cloud-based evaluation platform 208 may receive information and/or data from the agency computing device 204 and take one or more further actions.

For example, cloud-based evaluation platform 208 may also receive data associated with a user from commercial data computing device 206, including information associated with the user that indicates the user's personal information, as well as household, employment, financial, and/or substance abuse history, among other types of information. Such commercial data computing devices and services may be associated with one or more third-parties, including: GOOGLE®, LEXISNEXIS®, EXPERIAN®, EQUIFAX®, TRANSUNION®, among others. Before doing so, cloud-based evaluation platform 208 may prompt the user (e.g., via client computing device 202) for authorization to access the commercial data records via commercial data computing device 206, and, if granted, may also provide proof of the authorization along with the request for the information to the commercial data computing device 206. In a further aspect, the cloud-based evaluation platform 208 may receive information and/or data from the commercial data computing device 206 and take one or more further actions.

For example, in some embodiments, the cloud-based evaluation platform 208 may determine that there are one or more inconsistencies between data and/or information received from any number of sources (including client computing device 202, agency computing device 204, and/or commercial data computing device 206) and take one or more responsive actions. For example, in some embodiments, cloud-based evaluation platform 208 may issue a warning and/or a prompt to the user of client computing device 202 to correct certain information inputted into client computing device 202 and/or may issue corrective information to other devices (e.g., agency computing device 204 and/or commercial data computing device 206) based on the same, among other possibilities.

In any event, once the cloud-based evaluation platform 208 has received the user activity data and user agency data, cloud-based evaluation platform 208 may create a user profile that contains both public and private personal information associated with the user. This information may include public information associated with the user (e.g., name, phone number, marital status, etc.), but may also contain private/personal information associated with the user, some or all of which may be used to identify the user (e.g., PII). In some examples, the user may have inputted the PII (e.g., a social security number) via the client computing device 202 and/or authorized the cloud-based evaluation platform 208 to retrieve and/or receive the PII associated with the user from the agency computing device 204 and/or commercial data computing device 206, among other possibilities. In a further aspect, in example embodiments, the user may not realize that the information he/she is inputting into the client computing device 202 and/or authorized the cloud-based evaluation platform 208 to retrieve and/or receive comprises PII. Thus, in some embodiments, the cloud-based evaluation platform 208 may issue a prompt and/or other warning to the user (e.g., via a graphical user interface of client computing device 202) to take one or more actions to preserve and/or otherwise protect the user's PII.

To protect the user's PII and other information associated with the user, the cloud-based evaluation platform 208 may leverage one or more technologies to create a digital representation of information associated with the user (including PII) that indicates one or more activities associated with the user of the client computing device, one or more agency records associated with the user, and/or commercial data associated with the user, but does not contain personal information associated with the user. To do so, in some embodiments, the cloud-based evaluation platform 208 may generate one or more file (e.g., a PDF) and perform one or more securitization protocols to remove PII associated with the user (e.g., by redacting and/or removing the PII from the file). In other examples, the cloud-based evaluation platform 208 may issues the digital representation information associated with the user by issuing a digital cryptographic token and/or certificate that indicates one or more activities associated with the user of the client computing device, one or more agency records associated with the user, and/or commercial data associated with the user, but does not contain personal information associated with the user. In yet another example, the cloud-based evaluation platform 208 may maintain a distributed ledger (e.g., a distributed block-chain ledger), and create one or more ledger entries that indicate activities associated with the user, one or more agency records associated with the user, and/or commercial data associated with the user, but do not contain personal information associated with the user (e.g., via a hashing and/or other digital securitization protocols), among other possibilities.

Once the cloud-based evaluation platform 208 issues the digital representation, in some embodiments, cloud-based evaluation platform 208 may receive and/or retrieve one or more predetermined persona profiles from persona library computing device 210 (e.g., based on a request from cloud-based evaluation platform 208 to persona library computing device 210). After receiving these one or more predetermined persona profiles, cloud-based evaluation platform 208 may leverage one or more machine learning models and/or other artificial intelligence engines to identify a match between the digital representation and one or more of the plurality of predetermined persona profiles (e.g., by calculating, for each of the predetermined persona profiles, a respective extent of correlation to the digital representation). In some embodiments, once the match between the digital representation and one or more of the plurality of predetermined persona profiles has been established, then cloud-based evaluation platform 208 may suggest one or more actions associated with the one or more matched predetermined persona profiles to the user.

To do so, in example embodiments, the cloud-based evaluation platform 208 may reference the user's information stored in connection with the digital representation and/or user profile and transmit instructions that cause the client computing device 202 to display, via the user interface of the client computing device, a graphical indication of the suggested action to the user of the client computing device. In some embodiments, multiple suggested actions may identified by the cloud-based evaluation platform 208 and one or more of the suggested actions may be prioritized based on a number of factors (e.g., triage, health, household information, etc.). Other examples are possible.

For example, in some example embodiments, cloud-based evaluation platform 208 may leverage one or more machine learning models and/or other artificial intelligence engines to identify one or more pathways between the digital representation and/or the identified one or more of the plurality of predetermined persona profiles and the identified suggested action (e.g., by identifying one or more suggestions and/or instructions for accomplishing the suggested action).

To do so, in example embodiments, the cloud-based evaluation platform 208 may reference the user's information stored in connection with the digital representation and/or user profile and transmitting instructions that cause the client computing device 202 to display, via the user interface of the client computing device, a graphical indication of one or more instructions to accomplish the suggested action to the user of the client computing device. In some embodiments, multiple instructions and/or suggested actions may identified by the cloud-based evaluation platform 208 and one or more of the multiple instructions and/or suggested actions may be prioritized based on a number of factors (e.g., triage, health, household information, etc.). Other examples are possible.

C. Example Computing Environment

Figure 3:
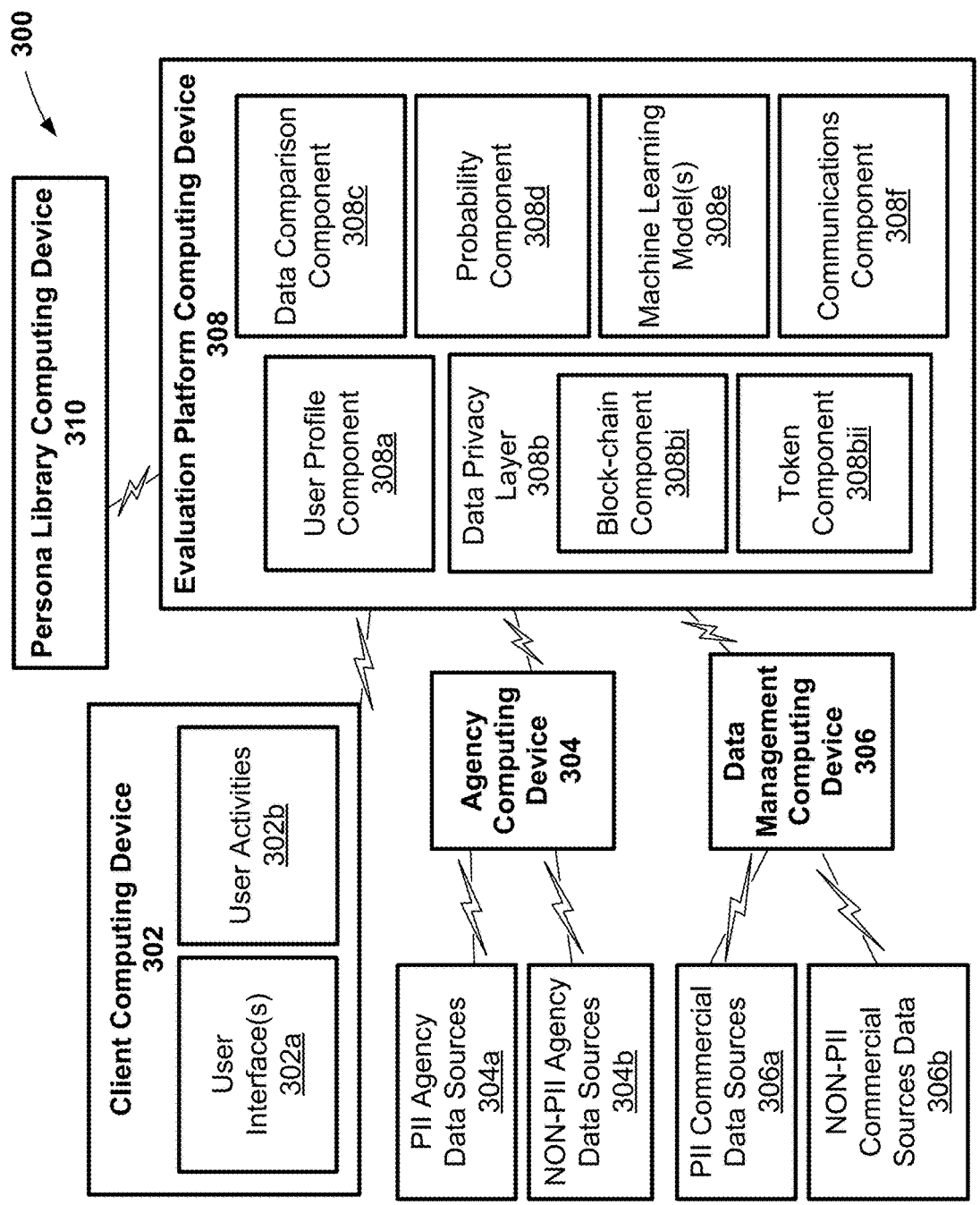
FIG. 3 is a simplified block diagram of an example computing system.

FIG. 3 is a simplified block diagram of an example computing environment 300. Computing environment 300 can include client computing device 302, agency computing device 304, data management computing device 306, evaluation platform computing device 308, and persona library computing device 310.

In some aspects, client computing device 302 can provide information to the user of client computing device 302, for example via user interface(s) 302a that provide, to a user, various portals, suggestions, information, instructions, services, and features offered by evaluation platform computing device 308. For example, evaluation platform computing device 308 may be a cloud-based platform (e.g., as illustrated and described in connection with FIG. 2), specializing in providing advice, input, or planning to one or more users to encourage personal and/or professional growth. Accordingly, user interface(s) 302a can display requests for user input, suggested actions for improving a user's life, and/or other selectable options, etc. that enable a user to view one or more suggested actions, life pathways, and/or instructions for accomplishing the same, and so forth.

A number of user activities 302b can occur at the client computing device 302. As the user navigates the various pages of one or more applications of client computing device 302, user activity related to viewing, searching, inputting information and preferences and so forth can be captured. In a further aspect, in order to support the user interface(s) 302a and the user activities 302b, a number of computing resources may be deployed, including monitoring each aspect of user interaction with the client computing device 302, and/or the computing infrastructure of the client computing device 302 (e.g., a touchscreen of client computing device 302), some or all of which can be stored as a record of all interactions with client computing device 302 on the client computing device 302, the evaluation platform computing device, or both, among other possibilities.

A host of information associated with the user may be stored on and/or retrieved and received from a number of additional computing devices. In example embodiments, such information may be stored on an agency computing device 304, which may receive and/or retrieve both PII and non-PII information associated with the user, for example from PII Agency Data Sources 304a and Non-PII Agency Data Sources 304b, respectively, among other possibilities. For example, in example embodiments, such information may be stored on an data management computing device 306, which may receive and/or retrieve both PII and non-PII information associated with the user, for example from PII Commercial Data Sources 306a and Non-PII Commercial Data Sources 306b, respectively, among other possibilities. In any event, once this information associated with the user is received by evaluation platform computing device 308, one or more components of evaluation platform computing device 308 may take one or more actions.

For example, user profile component 308a of evaluation platform computing device 308 may generate a user profile based on the received information (e.g., user activity data, user agency data, and/or commercial user data), which may also contain personal information associated with the user. To ensure this personal information does not get transmitted or otherwise relayed to unintended entities (e.g., entities that the user has not authorized to receive such personal information), data privacy layer 308b of evaluation platform computing device 308 may generate a digital representation that allows the evaluation platform computing device 308 to analyze and/or further distribute an indication of information associated with the user, but that does not contain any of the user's personal information. To do so, in example embodiments, evaluation platform computing device 308 may utilize a block-chain component 308bi (e.g., a distributed block-chain ledger) to create a digital representation (e.g., a ledger entry) that represents information associated with the user, but securitizes the user's personal information so that it is not distributed to an unintended entity. Other examples are possible. For example, in example embodiments, evaluation platform computing device 308 may utilize a token component 308bii (e.g., a token issuance and/or exchange platform) to create a digital representation (e.g., a digital cryptographic token and/or certificate) that represents information associated with the user, but securitizes the user's personal information so that it is not distributed to an unintended entity, among other possibilities.

For example, once evaluation platform computing device 308 generates the digital representation, data comparison component 308c can be configured to receive, from the client computing device 302, time-indexed data packets indicative of user activity associated with a user of the client computing device 302 via client computing device 302, agency computing device 304, and/or data management computing device 306, among other possibilities. Data comparison component 308c can also be configured to compare the time-indexed data packets from any or all of the client computing device 302, agency computing device 304, and/ or data management computing device 306 to determine whether there are any anomalies between the information received from client computing device 302, agency computing device 304, and/or data management computing device 306 and take one or more responsive actions based thereon. Analyzing user behavior as it relates to particular information (e.g., health status, employment status, government benefit status, etc.) at a particular time, can provide insights into one or more aspects of the user's activities and improve the ability of the evaluation platform computing device 308 to take one or more responsive actions. Anomalies associated with higher stakes for the evaluation platform computing device 308 (e.g., a user misrepresenting whether he/she already receives one or more particular government benefits) may then be prioritized for prioritized resolution (e.g., before any further government benefits may be allocated to the user).

The one or more anomalies can include a functional error, a communication error, a missing command error, a syntactic error, an operational error, a control flow error, or a mathematical error. Other anomalies are possible. Generally, a software product is configured to function in a certain manner. The term "functional error" as used herein may generally refer to any deviations from such expected functionality. In order to provide customer service, the client computing platform 305 may be configured to provide various messages, prompts, pop-ups, labels, etc. The term "communication error" as used herein may generally refer to any error in providing such communications to the user.

The client computing device 302 may also include various navigation buttons, and selectable icons that enable a user to perform operations such as inputting information associated with the user, selecting and/or canceling certain prompts, etc. The term "missing command error" as used herein may generally refer to any missing and/or disabled commands that interfere with a user's ability to effectively navigate and/or perform actions at the client computing device 302. The one or more anomalies can include a syntactic error such as a spelling error, a grammatical mistake, etc. Although such errors may appear harmless in general, they may cause significant impediments to a positive user experience, and/or impede one or more entities from accomplishing one or more of the functionalities described herein.

In some embodiments, probability component 308d can be configured to receive and/or retrieve one or more predetermined persona profiles from persona library computing device 310 (e.g., based on a request to persona library computing device 310) and allow evaluation platform 308 to identify a match between the digital representation and one or more of the plurality of predetermined persona profiles (e.g., by calculating, for each of the predetermined persona profiles, a respective extent of correlation to the digital representation). In some embodiments, probability component 308d can be configured to determine, at a given time, a probability that the user matches one or more predetermined persona profiles, some or all of which can be used to determine one or more suggested actions to improve the user's lifestyle (e.g., health, career, etc.).

In some embodiments, additional and/or alternative components of the evaluation platform 308 can be configured to leverage the one or more predetermined persona profiles from persona library computing device 310 to allow cloud-based evaluation platform 208 to identify a match between the digital representation and one or more of the plurality of predetermined persona profiles and determine, at a given time, a probability that the user matches one or more predetermined persona profiles, some or all of which can be used to determine one or more suggested actions to improve the user's lifestyle (e.g., health, career, etc.).

For example, machine learning model(s) 308e may be trained to perform one or more of the operations described herein. For example, machine learning model(s) 308e may be trained to determine, at a given time, a probability that the user matches one or more predetermined persona profiles, and so forth. For example, the machine learning model(s) 308e may generate a predictive model, such as based on a plurality of time-series information for a user, indicating a probability that the user matches one or more predetermined persona profiles and/or identifying one or more suggested actions to improve the user's lifestyle based on the same. In this regard, the machine learning model(s) 308e may objectively predict a best course of action for the user to proceed based on, at least, an identified one or more predetermined persona profiles and provide one or more suggested actions to improve the user's lifestyle-all without ever receiving any of the user's personal information (e.g., the user's PII).

In examples, machine learning model(s) 308e can also use the information associated with the user and/or a positive feedback from the user or other entities that the matching and suggested actions protocol was successful to further train and/or improve the accuracy of the machine learning model(s) 308e. Generally, machine learning model(s) 308e may be trained before ever being utilized based on an actual user's information (e.g., being trained during a training phase by using training data). In some example embodiments, machine learning models may be trained by utilizing one or more machine learning algorithms that are applied to the training data to recognize patterns and output the prediction. Machine learning algorithms can include artificial neural networks (e.g., convolutional neural networks, recurrent neural networks, a Bayesian network, a hidden Markov model, a Markov decision process, a logistic regression function, a support vector machine, a statistical machine learning algorithm, and/or a heuristic machine learning system), as well as other artificial intelligence engines. In example embodiments, these machine learning and/or artificial intelligence algorithms and engines may involve supervised, unsupervised, semi-supervised, and/or reinforcement learning techniques.

The communications component 308f can be configured to generate, transmit, and/or otherwise display various graphical representations of suggested actions and/or instructions for accomplishing these actions and/or pathways and/or send error notifications via graphical user interfaces (e.g., user interface(s) 302a of the client computing device 302). The communications component 308f can be configured to generate, transmit, and/or otherwise display various graphical representations of ranked suggested actions and/or instructions for accomplishing these actions and/or pathways and/or send error notifications via graphical user interfaces (e.g., user interface(s) 302a of the client computing device 302). Other examples are possible.

D. Example System Flow/Pathway Architecture and Predetermined Persona Profile

FIGS. 4A-4E are diagrams of various portions of an example system flow diagram and pathway architecture 400. Example flow diagram 400 can include data integration framework 401, combined data profile 402, data securitization 403, persona matching 404a, persona profile library 404b, virtual automated pathways 405a, virtual ML/AI pathway assistant 405b, targeted pathway outcomes 406, automated eligibility application 407, a user and caseworker interface 408, and pathway learning and evolution 409.

Figure 4A:
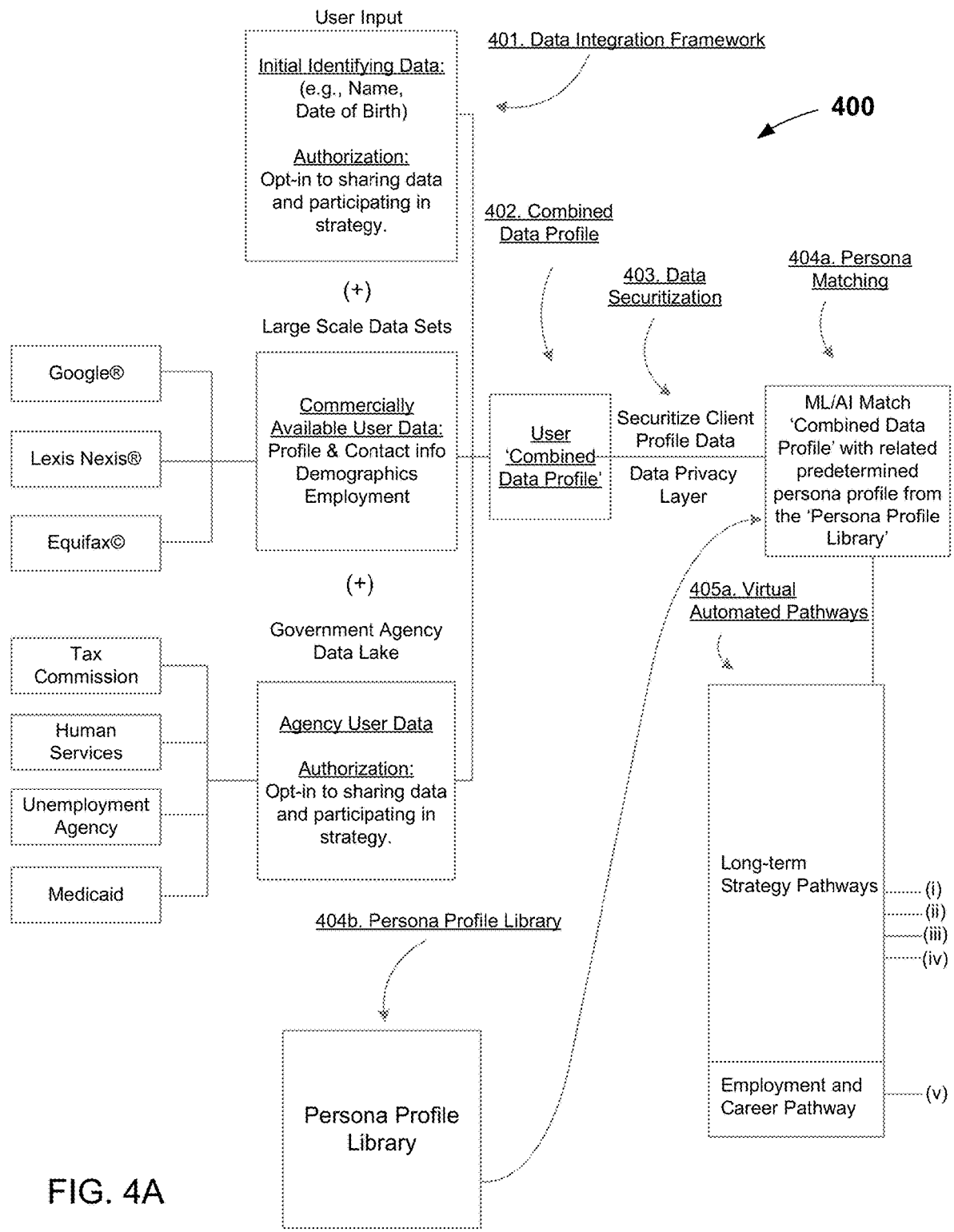
FIG. 4A is an example system flow diagram, at a first portion.

In example embodiments, as illustrated in FIG. 4A, data integration framework 401 can receive user input from a user that includes initial identifying information about a user (e.g., name, date of birth), as well as authorization to opt into a pathway planning program and/or authorization for an entity (referred to herein as the "evaluation platform") to retrieve and/or otherwise receive certain types of information associated with the user. This information can come from, for example, commercially available user data (e.g., from GOOGLE®, LEXIS NEXIS®, and EQUIFAX®, among other possibilities). This information can come from, for example, one or more federal and/or state government agencies (e.g., one or more Tax Commissions, one or more Human Services Offices, one or more Unemployment Agencies, and Medicaid, among other possibilities).

In example embodiments, once this information associated with the user is received, this information may be used to create a user profile (illustrated in FIG. 4A as a "User 'Combined Data Profile'"). Before this user profile (and any of the underlying information) is used further, a data securitization 403 protocol may be implemented to remove any PII associated with the user and/or any information associated with the user that the user has not authorized to be shared or otherwise distributed (or does not want to be shared or otherwise distributed). In example embodiments, this data securitization 403 protocol may be implemented as the issuance of a digital representation of the information associated with the user, but that does not contain any PII associated with the user and/or any information associated with the user that the user has not authorized to be shared or otherwise distributed (e.g., via one or more secure blockchain, token, certificate, or other securitization protocols described in further detail herein).

Once this digital representation has been issued, a persona matching 404a protocol may be undertaken to determine one or more matches between the digital representation of the information associated with the user and one or more predetermined persona profiles stored in persona profile library 404b. To do so, in example embodiments, one or more of the machine learning and/or artificial intelligence ("ML" and "AI", respectively) methods described herein may be used.

In example embodiments, as illustrated in FIG. 4A, once these one or more matches are identified, then one or more of the machine learning and/or artificial intelligence methods may be utilized to identify and/or otherwise generate one or more virtual automated pathways 405a (labeled in FIG. 4A as long-term pathways "(i)", "(ii)", "(iii)", "(iv)", and employment and career pathway "(v)"). Once these one or more virtual automated pathways 405a are generated and/or identified, the user may be presented with one or more suggested actions and/or instructions for proceeding down each, some, or all of these pathways to improve his/her lifestyle.

Figure 4B:
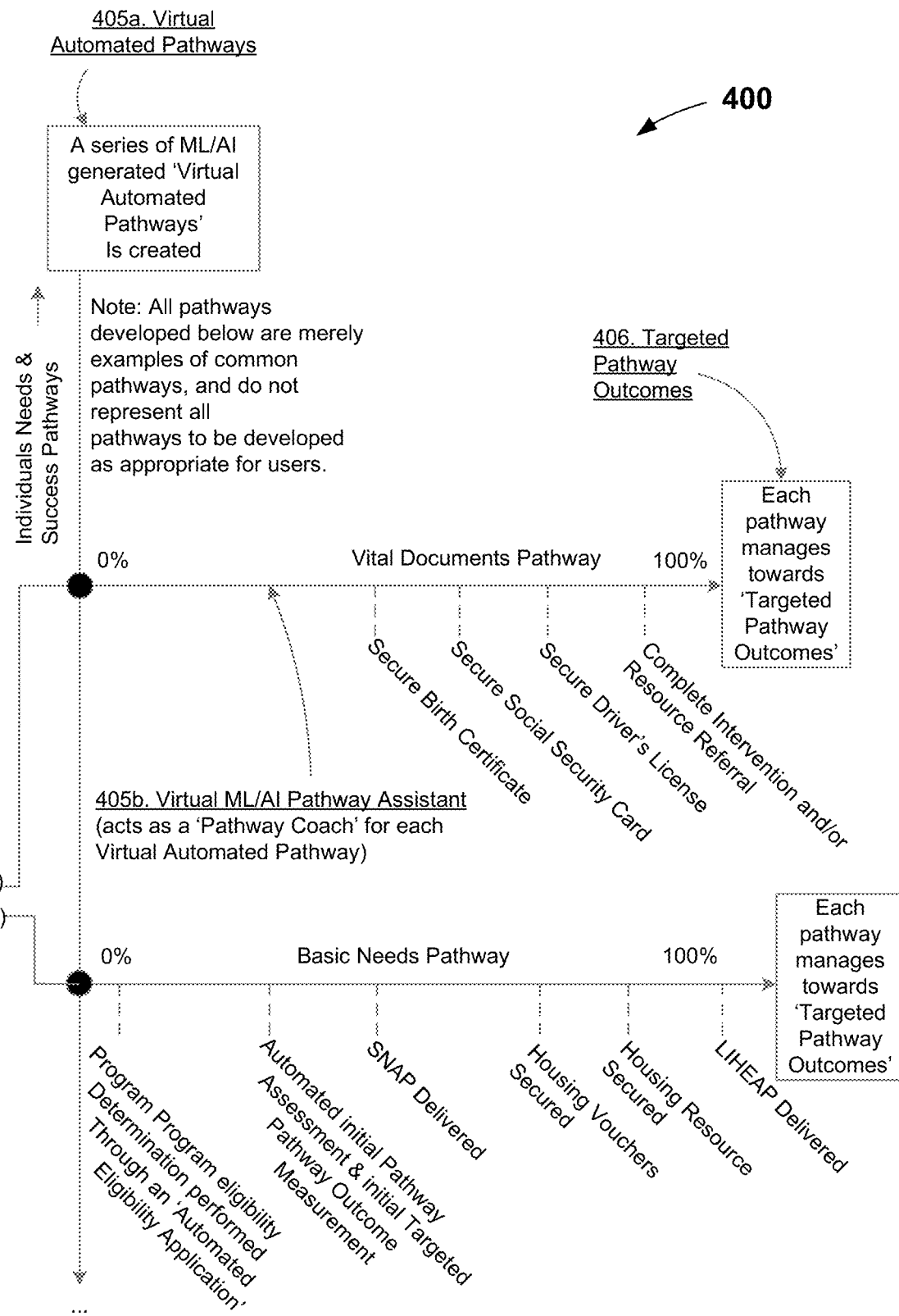
FIG. 4B is the example system flow diagram of FIG. 4A, but at a second portion.

For example, turning to FIG. 4B, these one or more virtual automated pathways 405a may include vital documents pathway (i), which may include a user's progress being tracked and/or otherwise evaluated (shown in FIG. 4B as "0%" to "100%") based on being presented with one or more instructions and completing the same (shown in FIG. 4B, along vital documents pathway (i) as "Secure Birth Certificate", "Secure Social Security Card", "Secure Driver's License", and "Complete Intervention and/or Resource Referral"). To further assist the user undertaking and/or completing the one or more instructions, one or more of the machine learning and/or artificial intelligence methods described herein may be utilized to provide a virtual ML/AI pathway assistant (e.g., a chat bot) to help coach and/or otherwise communicate with the user to improve the user's experience with and/or probability of completing the one or more instructions.

Further, as shown in FIG. 4B, once the user has undertaken and/or completed the one or more instructions, a targeted pathway outcome 406 may be stored and/or otherwise transmitted to the user and/or an entity/agency associated with the user (e.g., a Human Services Office), among other possibilities. In other example embodiments, additional virtual automated pathways 405a may be provided to the user and tracked/evaluated in a manner similar to vital documents pathway (i), including basic needs pathway (ii).

Figure 4C:
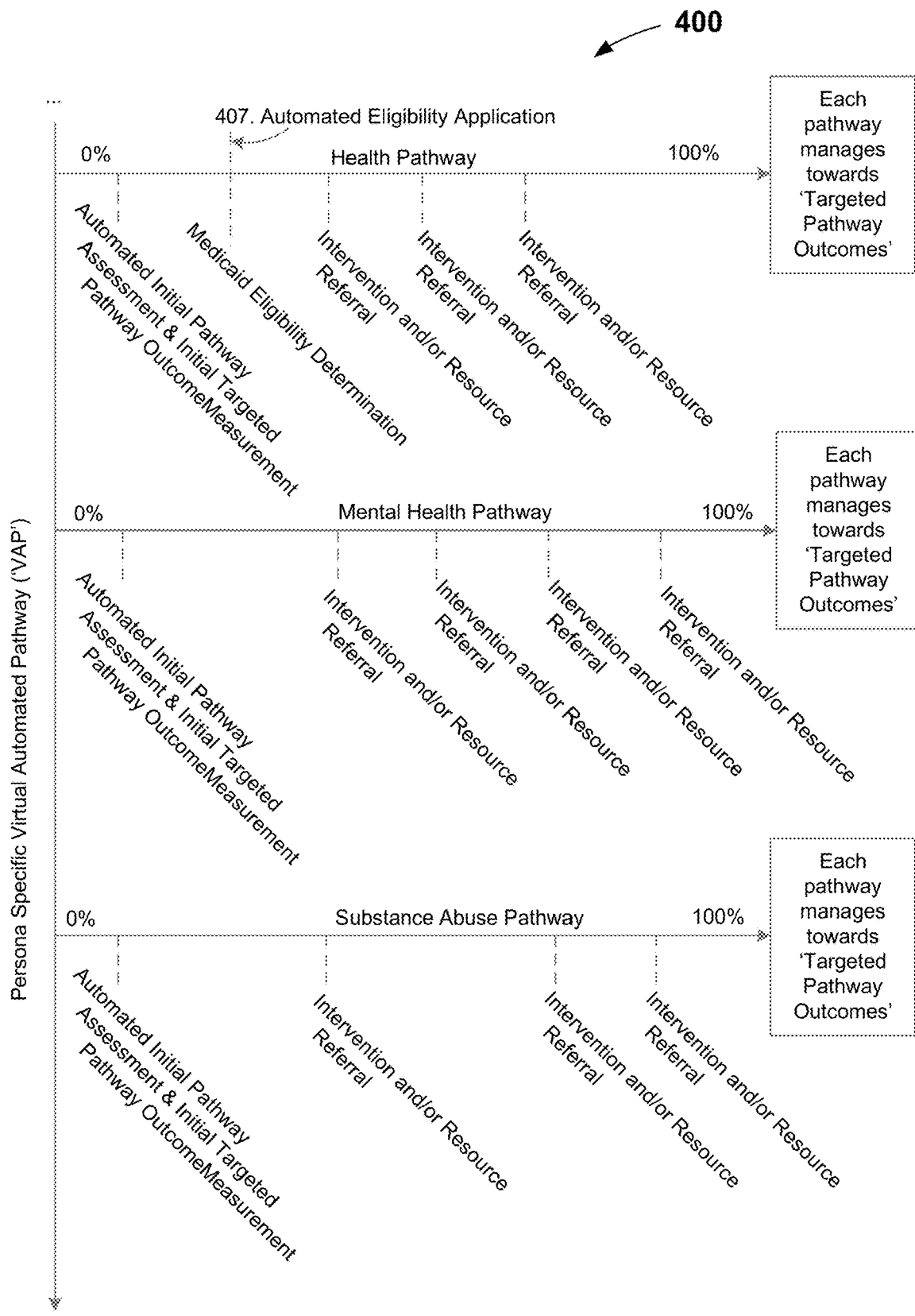
FIG. 4C is the example system flow diagram of FIGS. 4A-B, but at a third portion.

Turning to FIG. 4C, additional virtual automated pathways 405a may be provided to the user and tracked/evaluated in a manner similar to vital documents pathway (i) and basic needs pathway (ii), including a health pathway, which may include instructions for a user to apply for a health benefit (shown in FIG. 4C as "Medicaid") and if the application information inputted by the user is verified (e.g., compared to information associated with the user from agency and/or commercial data computing devices), then the user may be provided with and/or successfully complete automated eligibility application 407. In other example embodiments, additional virtual automated pathways 405 may be provided to the user and tracked/evaluated in a manner similar to vital documents pathway (i), basic needs pathway (ii), and/or health pathway, including mental health pathway and/or substance abuse pathway.

Figure 4D:
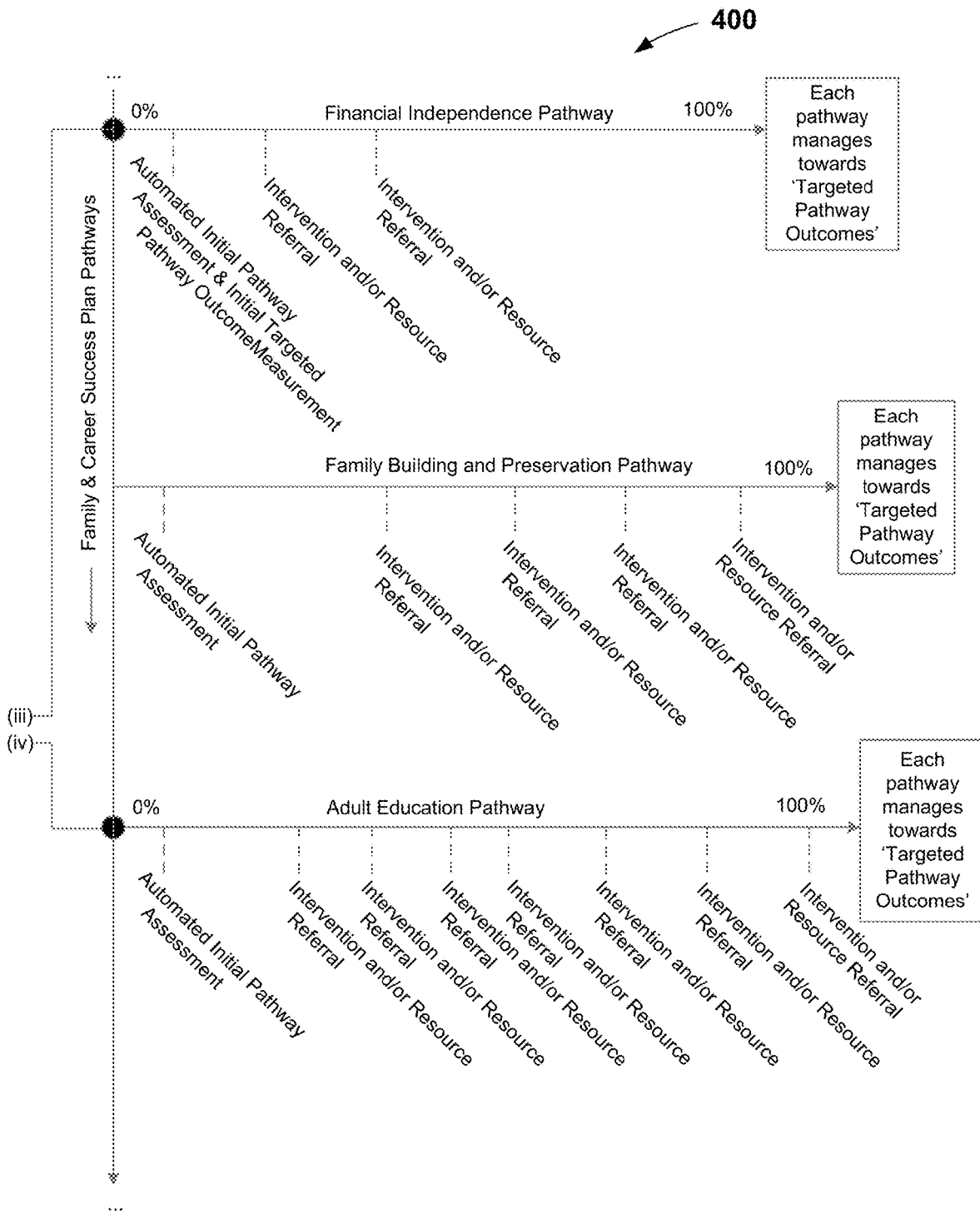
FIG. 4D is the example system flow diagram of FIGS. 4A-C, but at a fourth portion.

Turning to FIG. 4D, additional virtual automated pathways 405a may be provided to the user and tracked/evaluated in a manner similar to the pathways described herein, including a financial independence pathway (iii), family building and preservation pathway, and adult education pathway (iv), among other possibilities.

Figure 4E:
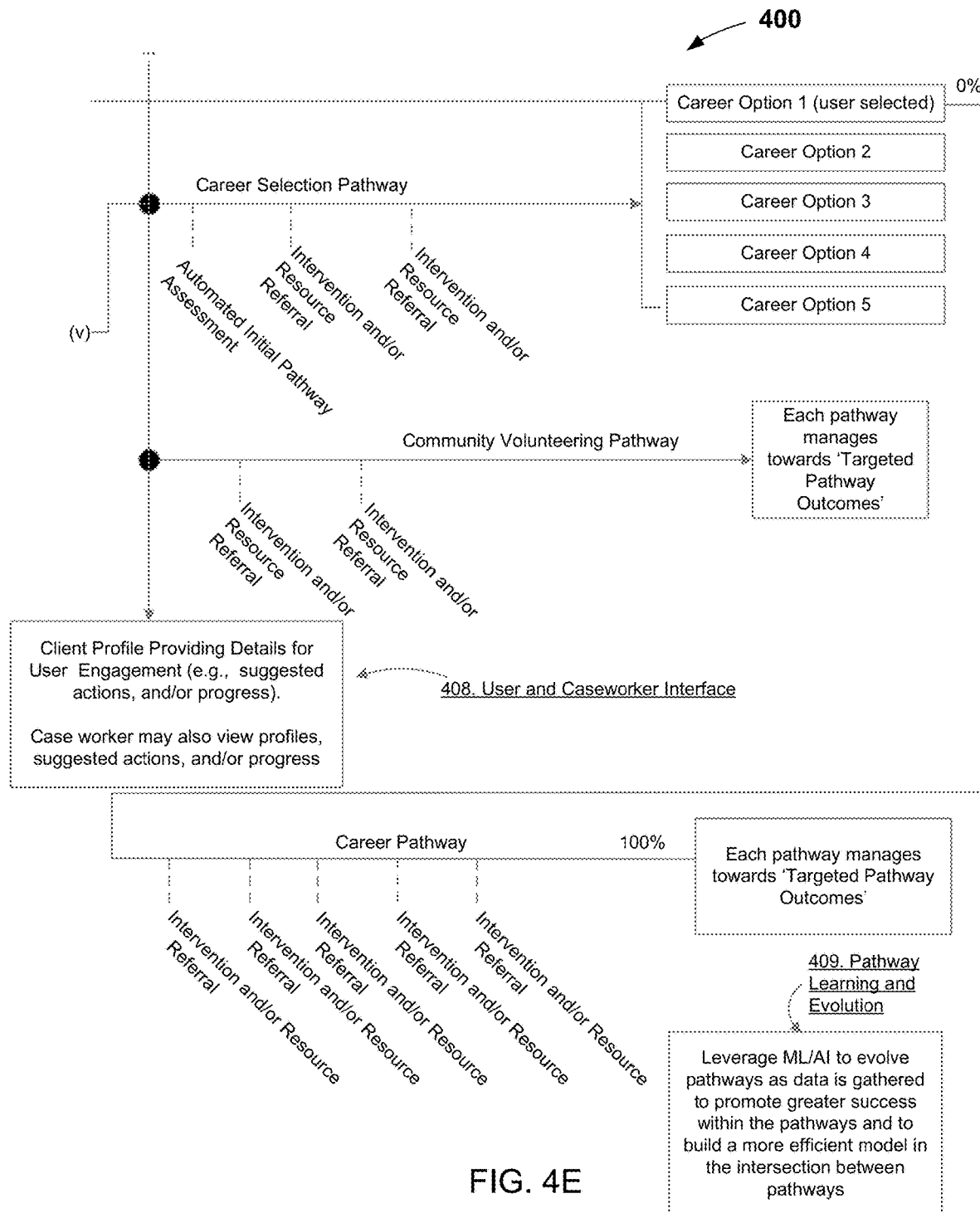
FIG. 4E is the example system flow diagram of FIGS. 4A-4D, but at a fifth portion.
Figure 5D:
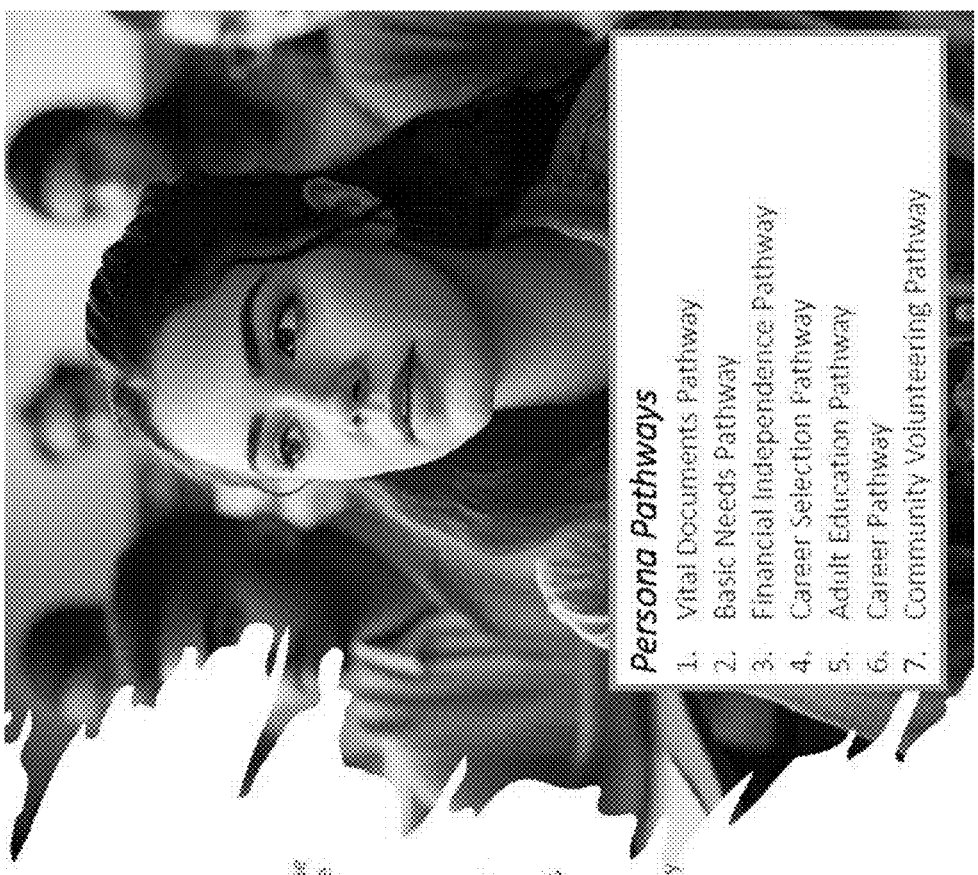
FIG. 5D is the example predetermined persona profile of FIGS. 5A-5C, but at a fourth portion.

Turning to FIG. 4E, additional virtual automated pathways 405a may be provided to the user and tracked/evaluated in a manner similar to the pathways described herein, including a career selection pathway (v), which may include instructions for a user to apply for a one or more employment opportunities and/or receive instructions on how a user may obtain qualifications for one or more career options, whether selected by the user or determined otherwise (shown in FIG. 4E as "Career Option 1 (user selected)" through "Career Option 5") and a community volunteering pathway. Further, as illustrated in FIG. 4E, the user and/or an entity associated with the user (e.g., a caseworker employed by a Human Services Office and assisting the user on their pathway progress), may be informed of the user's progress and/or otherwise communicate with the user via user and caseworker interface 408 to improve the user's experience with and/or probability of completing the one or more instructions.

In a further aspect, as illustrated in FIG. 4E, all of the user's and/or other entities' interaction with the virtual automated pathways 405a (and/or portions thereof) may be documented and/or stored in order to further train and/or otherwise leverage ML/AI to inform and evolve the pathways as data is gathered, which may further promote greater success within the pathways and build a more efficient model in the intersection between pathways-thereby further informing and building pathway learning evolution 409.

Additionally, although several pathways in FIGS. 4C-4E contain the text "Intervention and/or Resource Referral," this text is merely to illustrate example steps/prompts/instructions along each illustrated virtual pathway and may be replaced and/or supplemented by additional and/or alternative steps (e.g., such as the example steps/prompts/instructions along the pathways illustrated in FIG. 4B).

FIGS. 5A-5G illustrate various portions of and information relating to an example predetermined persona profile 500, according to an example embodiment.

III. Example Methods

Figure 6:
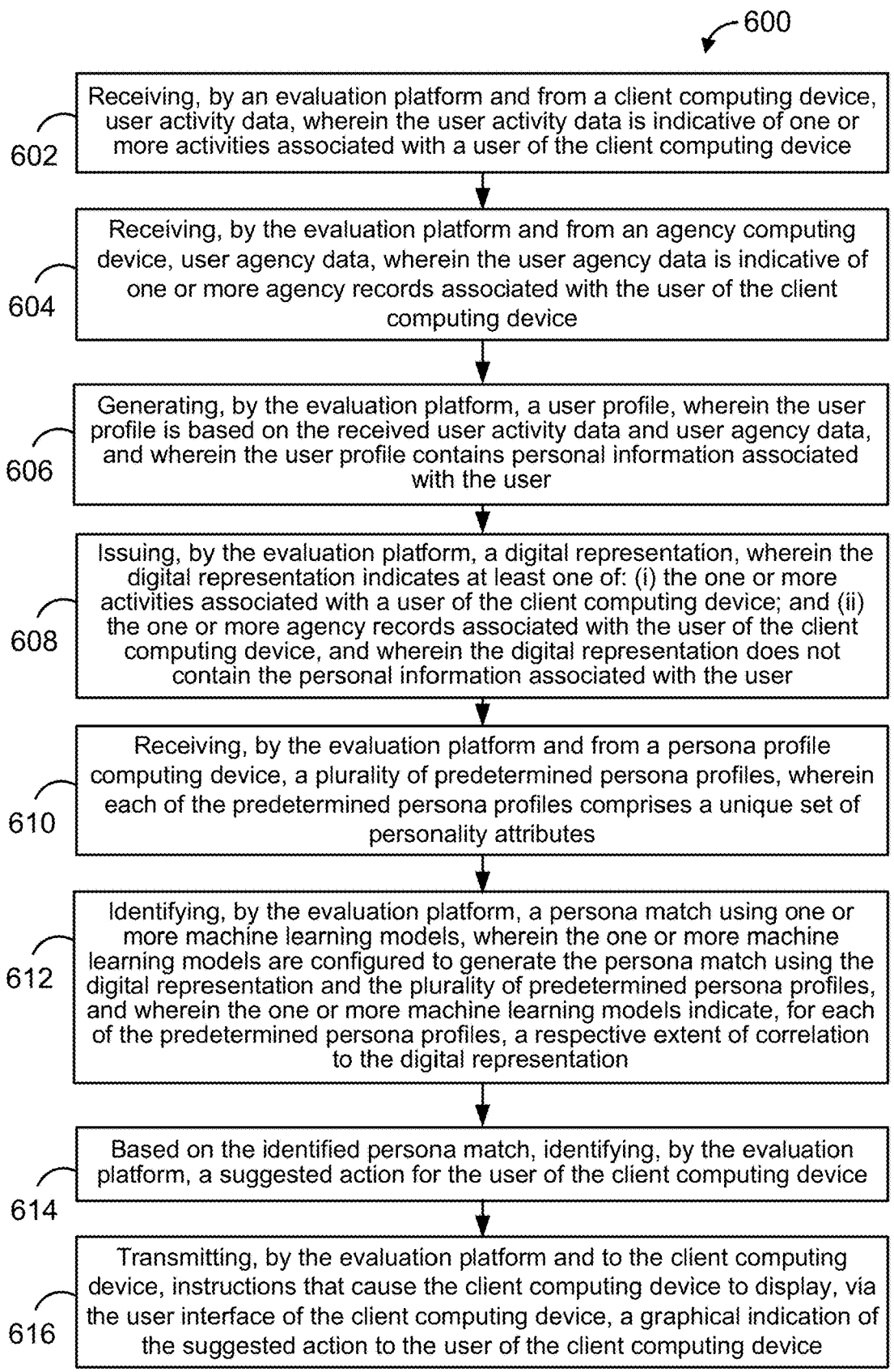
FIG. 6 is a flow chart of an example method.

FIG. 6 is a flow chart of an example method 600.

At block 602, the method 600 can include, receiving, by an evaluation platform and from a client computing device, user activity data, wherein the user activity data is indicative of one or more activities associated with a user of the client computing device. In some embodiments, the user activity data may comprise one or more of the following types of data associated with the user of the client computing device: (i) name; (ii) birthdate; (iii) demographic information; (iv) household information; (v) health information; (vi) mental health information; (vii) substance abuse information; (viii) financial information; (ix) educational information; (x) employment information; and (xi) government benefit information.

At block 604, the method 600 can include, receiving, by the evaluation platform and from an agency computing device, user agency data, wherein the user agency data is indicative of one or more agency records associated with the user of the client computing device. In some embodiments, the agency data may comprise one or more agency records associated with the user of the client computing device and containing one or more of the following: (i) name associated with the user; (ii) birthdate associated with the user; (iii) demographic information associated with the user; (iv) household information associated with the user; (v) health information associated with the user; (vi) mental health information associated with the user; (vii) substance abuse information associated with the user; (viii) financial information associated with the user; (ix) educational information associated with the user; (x) employment information associated with the user; and (xi) government benefit information associated with the user.

At block 606, the method 600 can include generating, by the evaluation platform, a user profile, wherein the user profile is based on the received user activity data and user agency data, and wherein the user profile contains personal information associated with the user. In some embodiments, generating, by the evaluation platform, the user profile, further comprises comparing the received user activity data and the received user agency data to determine any anomalies between the received user activity data and the received user agency data. In some example embodiments, based on the determined anomalies between the received user activity data and the received user agency data, method 600 may further comprise recommending, by the evaluation platform, one or more mitigation recommendations to correct the determined anomalies prior to issuing the digital representation. In some example embodiments, the recommending of the one or more mitigation recommendations to correct the one or more determined anomalies further comprises: (i) generating an error report identifying the determined anomalies to the user of the client computing device and (ii) providing the error report to the agency computing device.

At block 608, the method 600 can include, issuing, by the evaluation platform, a digital representation, wherein the digital representation indicates at least one of: (i) the one or more activities associated with a user of the client computing device; and (ii) the one or more agency records associated with the user of the client computing device, and wherein the digital representation does not contain the personal information associated with the user.

At block 610, the method 600 can include receiving, by the evaluation platform and from a persona profile computing device, a plurality of predetermined persona profiles, wherein each of the predetermined persona profiles comprises a unique set of personality attributes.

At block 612, the method 600 can include identifying, by the evaluation platform, a persona match using one or more machine learning models, wherein the one or more machine learning models are configured to generate the persona match using the digital representation and the plurality of predetermined persona profiles, and wherein the one or more machine learning models indicate, for each of the predetermined persona profiles, a respective extent of correlation to the digital representation. In some example embodiments, the persona match is based on an indication from the one or more machine learning models that a particular predetermined persona profile contains the highest extent of correlation to the digital representation. In some example embodiments, prior to identifying, by the evaluation platform, the persona match, method 600 may include training the one or more machine learning models to perform, for each of the predetermined persona profiles, identifying a respective extent of correlation to the digital representation.

At block 614, the method 600 can include, based on the identified persona match, identifying, by the evaluation platform, a suggested action for the user of the client computing device. In examples, the suggested actions comprise one or more of the following suggested actions associated with the user of the client computing device: (i) secure one or more vital documents associated with the user; (ii) secure basic needs associated with the user; (iii) improve one or more health statuses associated with the user; (iv) improve one or more household statuses associated with the user; (v) improve one or more substance abuse statuses associated with the user; (vii) improve one or more financial statuses associated with the user; (viii) improve one or more educational statuses associated with the user; (ix) improve one or more employment statuses associated with the user; and (x) improve one or more government benefit statuses associated with the user.

At block 616, the method 600 can include transmitting, by the evaluation platform and to the client computing device, instructions that cause the client computing device to display, via the user interface of the client computing device, a graphical indication of the suggested action to the user of the client computing device.

In some examples, method 600 further comprises, prior to receiving, by the evaluation platform, the user activity data or the user agency data, receiving, from the user of the client computing device, authorization for the evaluation platform to receive the user activity data or the user agency data.

In some examples, method 600 further comprises, receiving, by the evaluation platform and from a data management computing device, commercial user data, wherein the commercial user data is indicative of one or more commercial characteristics associated with a user of the client computing device, and wherein generating, by the evaluation platform, the user profile, is based on the received the user activity data, the user agency data, and the commercial user data. In some examples, the commercial user data comprises one or more of the following types of data associated with the user of the client computing device: (i) name; (ii) contact information; (iii) demographic information; (iv) household information; (v) health information; (vi) mental health information; (vii) substance abuse information; (viii) financial information; (ix) educational information; (x) employment information; and (xi) credit score information. In some examples, generating, by the evaluation platform, the user profile, further comprises comparing the received user activity data, the received user agency data, and the received commercial user data to determine any anomalies between the received user activity data, the received user agency data, and the received commercial user data. In further embodiments, method 600 may further comprise, based on the determined anomalies between the received user activity data, the received user agency data, and the received commercial user data, recommending, by the evaluation platform, one or more mitigation recommendations to correct the determined anomalies prior to issuing the digital representation. In example embodiments, recommending of the one or more mitigation recommendations to correct the determined anomalies further comprises (i) generating an error report identifying the determined anomalies to the user of the client computing device; and (ii) providing the error report to at least one of the agency computing device and the data management computing device.

In some examples, method 600 further comprises, identifying, by the evaluation platform, a pathway match using the one or more machine learning models, wherein the one or more machine learning models are further configured to generate the pathway match using the digital representation and the suggested action, and wherein the one or more machine learning models indicate, for the user of the client computing device, one or more instructions for accomplishing the suggested action and transmitting, by the evaluation platform and to the client computing device, instructions that cause the client computing device to display, via the user interface of the client computing device, a graphical indication of the one or more instructions for accomplishing the suggested action to the user of the client computing device. In example embodiments, the one or more instructions for accomplishing the suggested action comprise one or more instructions associated with the user of the client computing device for one or more of the following: (i) securing one or more vital documents associated with the user; (ii) securing basic needs associated with the user; (iii) improving one or more health statuses associated with the user; (iv) improving one or more household statuses associated with the user; (v) improving one or more substance abuse statuses associated with the user; (vii) improving one or more financial statuses associated with the user; (viii) improving one or more educational statuses associated with the user; (ix) improving one or more employment statuses associated with the user; and (x) improving one or more government benefit statuses associated with the user.

In some examples, method 600 further comprises (i) prioritizing, by the evaluation platform, a particular instruction of one or more instructions for accomplishing the suggested action and (ii) transmitting, by the evaluation platform and to the client computing device, instructions that cause the client computing device to display, via the user interface of the client computing device, a graphical indication of the prioritized instruction for accomplishing the suggested action to the user of the client computing device.

In some examples, method 600 further comprises, prior to identifying, by the evaluation platform, the persona match and the pathway match, training the one or more machine learning models to perform, for each of the predetermined persona profiles, identifying a respective extent of correlation to the digital representation and the one or more instructions for accomplishing the suggested action.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

I claim:

1. A computer-implemented method comprising:
receiving, by an evaluation platform and from a client computing device, user activity data, wherein the user activity data is indicative of one or more activities associated with a user of the client computing device;
receiving, by the evaluation platform and from an agency computing device, user agency data, wherein the user agency data is indicative of one or more agency records associated with the user of the client computing device;
generating, by the evaluation platform, a user profile, wherein the user profile is based on the received user activity data and user agency data, and wherein the user profile contains personal information associated with the user;
issuing, by the evaluation platform, a digital representation, wherein the digital representation indicates at least one of: (i) the one or more activities associated with a user of the client computing device; and (ii) the one or more agency records associated with the user of the client computing device, and wherein the digital representation does not contain the personal information associated with the user;
receiving, by the evaluation platform and from a persona profile computing device, a plurality of predetermined persona profiles, wherein each of the predetermined persona profiles comprises a unique set of personality attributes;
identifying, by the evaluation platform, a persona match using one or more machine learning models, wherein the one or more machine learning models are configured to generate the persona match using the digital representation and the plurality of predetermined persona profiles, and wherein the one or more machine learning models indicate, for each of the predetermined persona profiles, a respective extent of correlation to the digital representation;
based on the identified persona match, identifying, by the evaluation platform, a suggested action for the user of the client computing device;
identifying, by the evaluation platform, a pathway match using the one or more machine learning models, wherein the one or more machine learning models are further configured to generate the pathway match using the digital representation and the suggested action, and wherein the one or more machine learning models indicate, for the user of the client computing device, one or more instructions for accomplishing the suggested action; and
transmitting, by the evaluation platform and to the client computing device, instructions that cause the client computing device to display, via a user interface of the client computing device, a graphical indication of the suggested action and the one or more instructions for accomplishing the suggested action to the user of the client computing device.

2. The computer-implemented method of claim 1, wherein the user activity data comprises one or more of the following associated with the user of the client computing device: (i) name; (ii) birthdate; (iii) demographic information; (iv) household information; (v) health information; (vi) mental health information; (vii) substance abuse information; (viii) financial information; (ix) educational information; (x) employment information; and (xi) government benefit information.

3. The computer-implemented method of claim 1, wherein the user agency data comprises one or more agency records associated with the user of the client computing device and containing one or more of the following: (i) name associated with the user; (ii) birthdate associated with the user; (iii) demographic information associated with the user; (iv) household information associated with the user; (v) health information associated with the user; (vi) mental health information associated with the user; (vii) substance abuse information associated with the user; (viii) financial information associated with the user; (ix) educational information associated with the user; (x) employment information associated with the user; and (xi) government benefit information associated with the user.

4. The computer-implemented method of claim 1, wherein the persona match is based on an indication from the one or more machine learning models that a particular predetermined persona profile contains the highest extent of correlation to the digital representation.

5. The computer-implemented method of claim 1, wherein generating, by the evaluation platform, the user profile, further comprises comparing the received user activity data and the received user agency data to determine any anomalies between the received user activity data and the received user agency data.

6. The computer-implemented method of claim 5, wherein the method further comprises, based on the determined anomalies between the received user activity data and the received user agency data, recommending, by the evaluation platform, one or more mitigation recommendations to correct the determined anomalies prior to issuing the digital representation.

7. The computer-implemented method of claim 6, wherein the recommending of the one or more mitigation recommendations to correct the one or more determined anomalies further comprises:
generating an error report identifying the determined anomalies to the user of the client computing device; and
providing the error report to the agency computing device.

8. The computer-implemented method of claim 1, wherein the method further comprises:
prior to receiving, by the evaluation platform, the user activity data or the user agency data, receiving, from the user of the client computing device, authorization for the evaluation platform to receive the user activity data or the user agency data.

9. The computer-implemented method of claim 1, wherein the method further comprises:
receiving, by the evaluation platform and from a data management computing device, commercial user data, wherein the commercial user data is indicative of one or more commercial characteristics associated with a user of the client computing device, and wherein generating, by the evaluation platform, the user profile, is based on the received the user activity data, the user agency data, and the commercial user data.

10. The computer-implemented method of claim 9, wherein the commercial user data comprises one or more of the following associated with the user of the client computing device: (i) name; (ii) contact information; (iii) demographic information; (iv) household information; (v) health information; (vi) mental health information; (vii) substance abuse information; (viii) financial information; (ix) educational information; (x) employment information; and (xi) credit score information.

11. The computer-implemented method of claim 9, wherein generating, by the evaluation platform, the user profile, further comprises comparing the received user activity data, the received user agency data, and the received commercial user data to determine any anomalies between the received user activity data, the received user agency data, and the received commercial user data.

12. The computer-implemented method of claim 11, wherein the method further comprises, based on the determined anomalies between the received user activity data, the received user agency data, and the received commercial user data, recommending, by the evaluation platform, one or more mitigation recommendations to correct the determined anomalies prior to issuing the digital representation.

13. The computer-implemented method of claim 12, wherein the recommending of the one or more mitigation recommendations to correct the determined anomalies further comprises:
generating an error report identifying the determined anomalies to the user of the client computing device; and
providing the error report to at least one of the agency computing device and the data management computing device.

14. The computer-implemented method of claim 1, wherein the method further comprises, prior to identifying, by the evaluation platform, the persona match, training the one or more machine learning models to perform, for each of the predetermined persona profiles, identifying a respective extent of correlation to the digital representation.

15. The computer-implemented method of claim 1, wherein the suggested actions comprise one or more of the following suggested actions associated with the user of the client computing device: (i) secure one or more vital documents associated with the user; (ii) secure basic needs associated with the user; (iii) improve one or more health statuses associated with the user; (iv) improve one or more household statuses associated with the user; (v) improve one or more substance abuse statuses associated with the user; (vii) improve one or more financial statuses associated with the user; (viii) improve one or more educational statuses associated with the user; (ix) improve one or more employment statuses associated with the user; and (x) improve one or more government benefit statuses associated with the user.

16. The computer-implemented method of claim 1, wherein the one or more instructions for accomplishing the suggested action comprise one or more instructions associated with the user of the client computing device for one or more of the following: (i) securing one or more vital documents associated with the user; (ii) securing basic needs associated with the user; (iii) improving one or more health statuses associated with the user; (iv) improving one or more household statuses associated with the user; (v) improving one or more substance abuse statuses associated with the user; (vii) improving one or more financial statuses associated with the user; (viii) improving one or more educational statuses associated with the user; (ix) improving one or more employment statuses associated with the user; and (x) improving one or more government benefit statuses associated with the user.

17. The computer-implemented method of claim 1, wherein the method further comprises:
prioritizing, by the evaluation platform, a particular instruction of one or more instructions for accomplishing the suggested action; and
transmitting, by the evaluation platform and to the client computing device, instructions that cause the client computing device to display, via the user interface of the client computing device, a graphical indication of the prioritized instruction for accomplishing the suggested action to the user of the client computing device.

18. The computer-implemented method of claim 1, wherein the method further comprises, prior to identifying, by the evaluation platform, the persona match and the pathway match, training the one or more machine learning models to perform, for each of the predetermined persona profiles, identifying a respective extent of correlation to the digital representation and the one or more instructions for accomplishing the suggested action.

19. One or more non-transitory computer-readable media storing software comprising instructions executable by one or more processors that, upon such execution, cause the one or more processors to perform operations comprising:
receiving, by the one or more processors and from a client computing device, user activity data, wherein the user activity data is indicative of one or more activities associated with a user of the client computing device;
receiving, by the one or more processors and from an agency computing device, user agency data, wherein the user agency data is indicative of one or more agency records associated with the user of the client computing device;
generating, by the one or more processors, a user profile, wherein the user profile is based on the received user activity data and user agency data, and wherein the user profile contains personal information associated with the user;
issuing, by the one or more processors, a digital representation, wherein the digital representation indicates at least one of: (i) the one or more activities associated with a user of the client computing device; and (ii) the one or more agency records associated with the user of the client computing device, and wherein the digital representation does not contain the personal information associated with the user;
receiving, by the one or more processors and from a persona profile computing device, a plurality of predetermined persona profiles, wherein each of the predetermined persona profiles comprises a unique set of personality attributes;
identifying, by the one or more processors, a persona match using one or more machine learning models, wherein the one or more machine learning models are configured to generate the persona match using the digital representation and the plurality of predetermined persona profiles, and wherein the one or more machine learning models indicate, for each of the predetermined persona profiles, a respective extent of correlation to the digital representation;
based on the identified persona match, identifying, by the one or more processors, a suggested action for the user of the client computing device;
identifying, by the one or more processors, a pathway match using the one or more machine learning models, wherein the one or more machine learning models are further configured to generate the pathway match using the digital representation and the suggested action, and wherein the one or more machine learning models indicate, for the user of the client computing device, one or more instructions for accomplishing the suggested action; and
transmitting, by the one or more processors and to the client computing device, instructions that cause the client computing device to display, via a user interface of the client computing device, a graphical indication of the suggested action and the one or more instructions for accomplishing the suggested action to the user of the client computing device.

\* \* \* \* \*